(12) United States Patent
Chhabra et al.

(10) Patent No.: US 11,468,265 B2
(45) Date of Patent: Oct. 11, 2022

(54) NEURAL NETWORKS FOR DISCOVERING LATENT FACTORS FROM DATA

(71) Applicant: Hitachi, Ltd., Tokyo (JP)

(72) Inventors: Mohit Chhabra, Tokyo (JP); Martin Klinkigt, Tokyo (JP); Tomokazu Murakami, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 845 days.

(21) Appl. No.: 16/389,532

(22) Filed: Apr. 19, 2019

(65) Prior Publication Data

US 2019/0354806 A1 Nov. 21, 2019

(30) Foreign Application Priority Data

May 15, 2018 (JP) ................ JP2018-094146

(51) Int. Cl.
| | |
|---|---|
| G06K 9/00 | (2022.01) |
| G06K 9/62 | (2022.01) |
| G06N 3/04 | (2006.01) |
| G06N 5/02 | (2006.01) |
| G06N 7/08 | (2006.01) |

(52) U.S. Cl.
CPC ........... *G06K 9/6257* (2013.01); *G06K 9/623* (2013.01); *G06K 9/6259* (2013.01); *G06N 3/0445* (2013.01); *G06N 5/022* (2013.01); *G06N 7/08* (2013.01)

(58) Field of Classification Search
CPC .... G06K 9/6257; G06K 9/623; G06K 9/6259; G06N 3/0455; G06N 5/022; G06N 7/08
See application file for complete search history.

(56) References Cited

U.S. PATENT DOCUMENTS

| | | | |
|---|---|---|---|
| 10,373,055 B1* | 8/2019 | Matthey-de-l'Endroit | ................ G06N 7/005 |
| 2017/0328194 A1* | 11/2017 | Liu | ...................... G06N 3/0454 |
| 2019/0095798 A1* | 3/2019 | Baker | .................... G06N 3/063 |

FOREIGN PATENT DOCUMENTS

WO WO 2018/085697 A1 5/2018

OTHER PUBLICATIONS

Extended European Search Report issued in counterpart European Application No. 19171496.3 dated Oct. 7, 2019 (10 pages).
Vincent et al., "Extracting and Composing Robust Features with Denoising Autoencoders", Proceedings of the 25th International Conference on Machine Learning, Jul. 5, 2008, pp. 1096-1103, ACM Press, New York, New York, XP058106428 (eight pages).

* cited by examiner

*Primary Examiner* — Khai M Nguyen

(74) *Attorney, Agent, or Firm* — Crowell & Moring LLP

(57) ABSTRACT

Aspects of the disclosure relate to a method for discovering latent factors from data in a neural network environment. Aspects include adding, by a data noise unit of the neural network environment, noise to a set of input data; computing, by the encoder model and a set of stochastic non-linear units, a set of latent code based on the set of input data; obtaining, by decoding the latent code with a decoder model, a set of reconstructed data.

12 Claims, 16 Drawing Sheets

NEURAL NETWORKS FOR DISCOVERING LATENT FACTORS FROM DATA

CROSS-REFERENCE TO RELATED APPLICATIONS

The present application claims priority to Japanese Patent Application No. 2018-094146, filed May 15, 2018. The contents of this application are incorporated herein by reference in their entirety.

TECHNICAL FIELD

The present invention relates generally to a method, device, and computer program product for discovering latent factors from data in a neural network environment.

BACKGROUND ART

In recent years, neural networks are being leveraged to facilitate machine learning techniques in a variety of fields. Unsupervised learning is a branch of machine learning which aims to use unlabeled data to derive meaningful relationships. Unlabeled data is available in large quantities, whereas labeled data may be difficult to obtain, and its usage raises privacy concerns. In addition, this labeling process is prone to bias, and it can be expensive to create unbiased labels. Furthermore, as there are cases where the latent factors in the data may not be interpretable by humans, it is desirable to automatically discover the latent features in the data. Such an unsupervised learning approach may be used for automatically clustering and discovering hierarchical relationships in the data. One way of approaching such unsupervised learning tasks is to use an auto-encoder architecture. An encoder model may be used to generate a set of latent code that represents the salient features of the original input data. Subsequently, a decoder model may be used to reconstruct the data.

For example, Patent Document 1 discloses a technique for "predicting failure of an apparatus, the method being performed by a failure prediction system, the method comprising: receiving input data related to the apparatus; dimensionally reducing, with an auto-encoder, the input data to feature data; and providing the feature data to a machine learning classifier."

CITATION LIST

Patent Literature

[Patent Document 1] US Patent Application US20170328194A1

SUMMARY OF INVENTION

Technical Problem

Patent Document 1 discloses a technique for using a machine learning classifier to predict apparatus failures using input data that was dimensionally reduced using an auto-encoder. However, the technique of Patent Document 1 does not disclose the use of a de-noising encoder with stochastic non-linear activation units. Further, the technique of Patent Document 1 primarily focuses on apparatus failure prediction, which limits its applicability to other fields.

In addition, current approaches do not use ordered codes (e.g., a set of ordered latent code) to represent data. Thus, the codes produced are distributed in nature. While these codes may be efficient for immediate use in classification tasks, the position where they appear in the code is not controlled. In contrast, the present disclosure imposes a loss on the code to produce ordered codes. This can be used to automatically discover hidden relationships in data and reveal hierarchical relationships in the data. In contrast to conventional methods, the present disclosure treats the codes as categorical variables instead of as a continuous distribution. These variables can then be modified or used in their original form to generate data with desired attributes.

Further, current methods of conditional data generation using neural networks train the conditional network along with the entire network. Thus, if the conditional embeddings change, the entire network must be trained again. The present disclosure mitigates this issue by utilizing a translation network and a classification network. While conventional approaches may be used for discovery of generation of desired attributes in unlabeled data, thereby addressing some privacy concerns, these approaches may not be sufficient for highly sensitive data. While conventional methods have proposed the use of homomorphic encryption to encrypt the data and neural networks with polynomial operations to generate encrypted predictions, these techniques are not effective in cases where encrypted data is only used for pre-training the network.

Solution to Problem

Accordingly, aspects of the present disclosure relate to a method for discovering latent factors from data in a neural network environment. Aspects relate to adding, by a data noise unit of the neural network environment, noise to a set of input data; computing, by the encoder model and a set of stochastic non-linear units, a set of latent code based on the set of input data; and obtaining, by decoding the latent code with a decoder model, a set of reconstructed data.

Advantageous Effects of Invention

According to the present invention, by imposing a loss on a set of input data using noise addition, ordered codes (e.g., a set of latent code) may be generated that represent the set of input data. This latent code may be used to identify latent features and hierarchical relationships in the data. In addition, by treating this latent code as a categorical variable instead of as a continuous distribution, these variables can then be modified or used in their original form to generate data with desired attributes (e.g., produce augmented data). Further, by utilizing a translation model and a classification model, benefits including efficient neural network training and security of sensitive data may be realized. Aspects of the present disclosure may be associated with machine learning training efficiency, reduced cost (e.g., in terms of financial cost and computing resources), and data security.

DESCRIPTION OF EMBODIMENT(S)

Figure 1:
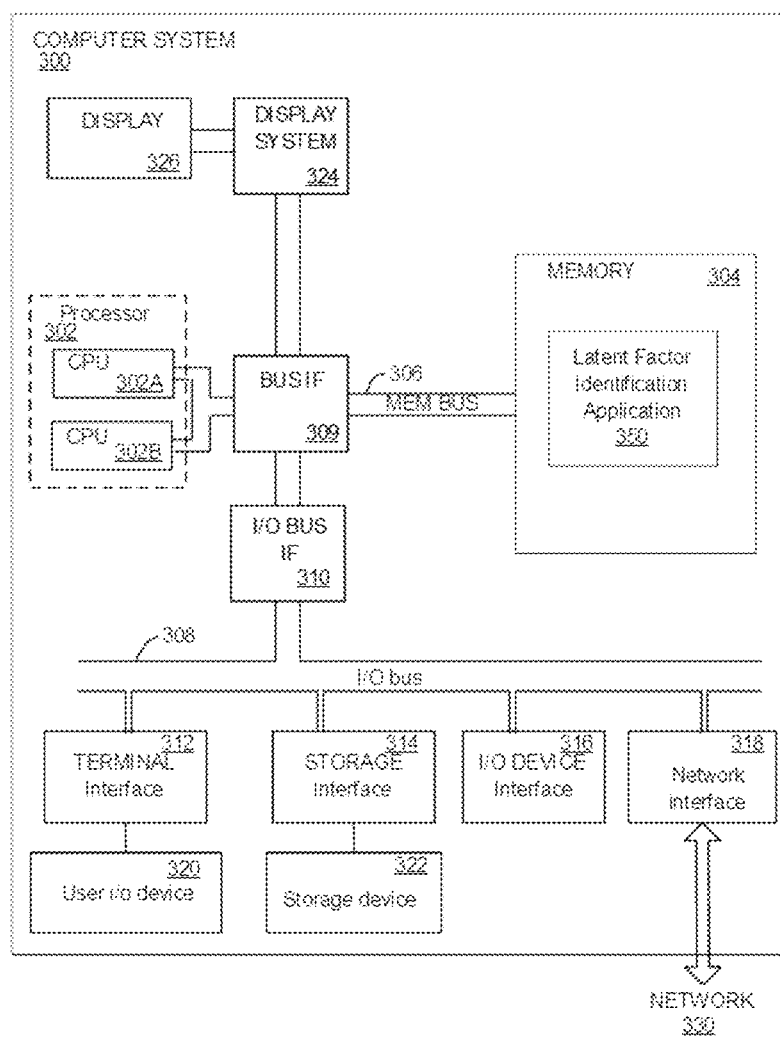
FIG. 1 is a block diagram of a computer system for implementing aspects of the present disclosure, according to embodiments.

Hereinafter, embodiments of the present invention will be described with reference to the Figures. It should be noted that the embodiments described herein are not intended to limit the invention according to the claims, and it is to be understood that each of the elements and combinations thereof described with respect to the embodiments are not strictly necessary to implement the aspects of the present invention.

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, the sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter.

Aspects of the disclosure, in embodiments, relate to neural networks. Generally, neural networks refer to computation models with the capacity for machine learning and pattern recognition. A neural network can be defined by a set of input neurons which are activated by input data. A neural network consists of a set of neurons, which are organized into layers. Typically, a neural network consists of an input layer which represents features, and an output layer which represents labels and several hidden layers. Neurons in adjacent layers can be connected with edges, where weights are associated. The weight parameters are learned in a training phase and can be used to make predictions.

In operation, after the input data is weighted and transformed by a function, the activations of the neurons are passed to other neurons. The process is repeated until an output neuron is activated to generate output results data associated with the input data. For example, a predication can be made starting from an input layer with forward activation computed layer by layer. Neural network functionality and output results data can be based on other types of fields including speech recognition, handwriting recognition, computer vision, and natural language processing.

Neural networks can be implanted in different types of operating environments. For example, a cloud computing platform implementation of neural networks can provide scalable and efficient neural network functionality. A cloud computing platform may span wide geographic locations, including countries and continents. The service-application components (e.g., tenant infrastructure or tenancy) of the cloud computing platform may include nodes (e.g., computing devices, processing units, or blades in a server rack) that are allocated to run one or more portions of a tenant's services and applications. When more than one application is being supported by the nodes, the nodes may be partitioned into virtual machines or physical machines. The virtual machines or physical machines run each application concurrently in individualized computing environments. The computing environments support the resources and/or operating systems specific to each application. Further, each application may be divided into functional portions such that each functional portion is able to run on a separate virtual machine or physical machine. The cloud computing platform can support, in particular, an implementation of a neural network machine learning technology to advantageously provide advanced machine learning algorithms in addition to management and operational infrastructure of the cloud computing platform. Other types of operating environments are contemplated with embodiments described herein.

In a cloud computing platform machine learning implementation of neural networks, a trained neural network can be placed on cloud computing platform components to perform neural network computations. Neural network computations may specifically be performed to make predication based on user input data. In operation, a user can upload their data to the cloud computing platform and grant the cloud computing platform components full access to the data. Neural network computation can performed using neural network models that are trained on plaintext or unencrypted data. Specifically, neural network models can be trained on plaintext or unencrypted data to perform predictions based on user query data.

Regulatory compliance, security, and privacy restrictions associated with data may necessitate the encryption of the data prior to performing neural network computations. By way of example, medical records, financial data, Personally Identifiable Information (PIO data, and government documents can be associated with restrictions that limit the capacity for machine learning operations to be performed on the user data. Unencrypted data is different from encrypted data in that encrypted data is encoded such that only authorized parties can read the data. When data is encrypted, the content of the data is denied to an interceptor. In this regard, conventional neural networks models do not support neural network computations on encrypted data because the neural network models are not configured to perform computations on encrypted data.

The present disclosure relates to a method and system for discovering latent factors in data using deep learning. Existing approaches using unlabeled data generate distributed embeddings where changes to the elements in the latent code leads to unpredictable reconstruction results. The proposed invention uses stochastic units in an auto-encoder architecture and imposes a hidden state code-length loss to discover important factors of variation in the data. With unlabeled data this produces latent factors in the data that reveal the hierarchical relationships in the data. This is different from a simple $L_1$ norm (Least Absolute Deviations) penalty on the codes in that unweighted $L_1$ sparsity penalty does not discover ordered hierarchical relationships in the data. Further, by utilizing a translation model and a classifier with the decoder model, the resultant model can be used to generate data with desired attributes. Such a model can be used to transform pre-decided codes to codes which produce required attributes in decoder output.

To deal with the case where the privacy concerns for the data are stringent, aspects of the present disclosure relate to using homomorphic encryption with neural networks constituted from polynomial operations to pre-train the models. For prediction, encrypted data is fed into the system and the model output is also encrypted data. This disclosure relates to using encrypted data only for pre-training and uses unencrypted data for prediction, and produces un-encrypted data as the output. This is different from earlier approaches in that, at deployment, the input data is not encrypted and the outputs are also not encrypted; instead the encrypted data is only used for pre-training the network and fine-tuned using public data.

Turning now to the Figures, FIG. 1 depicts a high-level block diagram of a computer system 300 for implementing various embodiments of the present disclosure, according to embodiments. The mechanisms and apparatus of the various embodiments disclosed herein apply equally to any appropriate computing system. The major components of the computer system 300 include one or more processors 302, a memory 304, a terminal interface 312, a storage interface 314, an I/O (Input/Output) device interface 316, and a network interface 318, all of which are communicatively coupled, directly or indirectly, for inter-component communication via a memory bus 306, an I/O bus 308, bus interface unit 309, and an I/O bus interface unit 310.

The computer system 300 may contain one or more general-purpose programmable central processing units (CPUs) 302A and 302B, herein generically referred to as the processor 302. In embodiments, the computer system 300 may contain multiple processors; however, in certain embodiments, the computer system 300 may alternatively be a single CPU system. Each processor 302 executes instructions stored in the memory 304 and may include one or more levels of on-board cache.

In embodiments, the memory 304 may include a random-access semiconductor memory, storage device, or storage medium (either volatile or non-volatile) for storing or encoding data and programs. In certain embodiments, the memory 304 represents the entire virtual memory of the computer system 300, and may also include the virtual memory of other computer systems coupled to the computer system 300 or connected via a network. The memory 304 can be conceptually viewed as a single monolithic entity, but in other embodiments the memory 304 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 304 may store all or a portion of the various programs, modules and data structures for processing data transfers as discussed herein. For instance, the memory 304 can store a latent factor identification application 350. In embodiments, the latent factor identification application 350 may include instructions or statements that execute on the processor 302 or instructions or statements that are interpreted by instructions or statements that execute on the processor 302 to carry out the functions as further described below. In certain embodiments, the latent factor identification application 350 is implemented in hardware via semiconductor devices, chips, logical gates, circuits, circuit cards, and/or other physical hardware devices in lieu of, or in addition to, a processor-based system. In embodiments, the latent factor identification application 350 may include data in addition to instructions or statements. In certain embodiments, a camera, sensor, or other data input device (not shown) may be provided in direct communication with the bus interface unit 309, the processor 302, or other hardware of the computer system 300. In such a configuration, the need for the processor 302 to access the memory 304 and the latent factor identification application may be reduced.

The computer system 300 may include a bus interface unit 309 to handle communications among the processor 302, the memory 304, a display system 324, and the I/O bus interface unit 310. The I/O bus interface unit 310 may be coupled with the I/O bus 308 for transferring data to and from the various I/O units. The I/O bus interface unit 310 communicates with multiple I/O interface units 312, 314, 316, and 318, which are also known as I/O processors (IOPs) or I/O adapters (IOAs), through the I/O bus 308. The display system 324 may include a display controller, a display memory, or both. The display controller may provide video, audio, or both types of data to a display device 326. Further, the computer system 300 may include one or more sensors or other devices configured to collect and provide data to the processor 302. As examples, the computer system 300 may include biometric sensors (e.g., to collect heart rate data, stress level data), environmental sensors (e.g., to collect humidity data, temperature data, pressure data), motion sensors (e.g., to collect acceleration data, movement data), or the like. Other types of sensors are also possible. The display memory may be a dedicated memory for buffering video data. The display system 324 may be coupled with a display device 326, such as a standalone display screen, computer monitor, television, or a tablet or handheld device display. In one embodiment, the display device 326 may include one or more speakers for rendering audio. Alternatively, one or more speakers for rendering audio may be coupled with an I/O interface unit. In alternate embodiments, one or more of the functions provided by the display system 324 may be on board an integrated circuit that also includes the processor 302. In addition, one or more of the functions provided by the bus interface unit 309 may be on board an integrated circuit that also includes the processor 302.

The I/O interface units support communication with a variety of storage and I/O devices. For example, the terminal interface unit 312 supports the attachment of one or more user I/O devices 320, which may include user output devices (such as a video display device, speaker, and/or television set) and user input devices (such as a keyboard, mouse, keypad, touchpad, trackball, buttons, light pen, or other pointing device). A user may manipulate the user input devices using a user interface in order to provide input data and commands to the user I/O device 320 and the computer system 300, and may receive output data via the user output devices. For example, a user interface may be presented via the user I/O device 320, such as displayed on a display device, played via a speaker, or printed via a printer.

The storage interface 314 supports the attachment of one or more disk drives or direct access storage devices 322 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 322 may be implemented via any type of secondary storage device. The contents of the memory 304, or any portion thereof, may be stored to and retrieved from the storage device 322 as needed. The I/O device interface 316 provides an interface to any of various other I/O devices or devices of other types, such as printers or fax machines. The network interface 318 provides one or more communication paths from the computer system 300 to other digital devices and computer systems; these communication paths may include, for example, one or more networks 330.

Although the computer system 300 shown in FIG. 1 illustrates a particular bus structure providing a direct communication path among the processors 302, the memory 304, the bus interface 309, the display system 324, and the I/O bus interface unit 310, in alternative embodiments the computer system 300 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 310 and the I/O bus 308 are shown as single respective units, the computer system 300 may, in fact, contain multiple I/O bus interface units 310 and/or multiple I/O buses 308. While multiple I/O interface units are shown which separate the I/O bus 308 from various communications paths running to the various I/O devices, in other embodiments, some or all of the I/O devices are connected directly to one or more system I/O buses.

In various embodiments, the computer system 300 is a multi-user mainframe computer system, a single-user system, or a server computer or similar device that has little or no direct user interface, but receives requests from other computer systems (clients). In other embodiments, the computer system 300 may be implemented as a desktop computer, portable computer, laptop or notebook computer, tablet computer, pocket computer, telephone, smart phone, or any other suitable type of electronic device.

Figure 2:
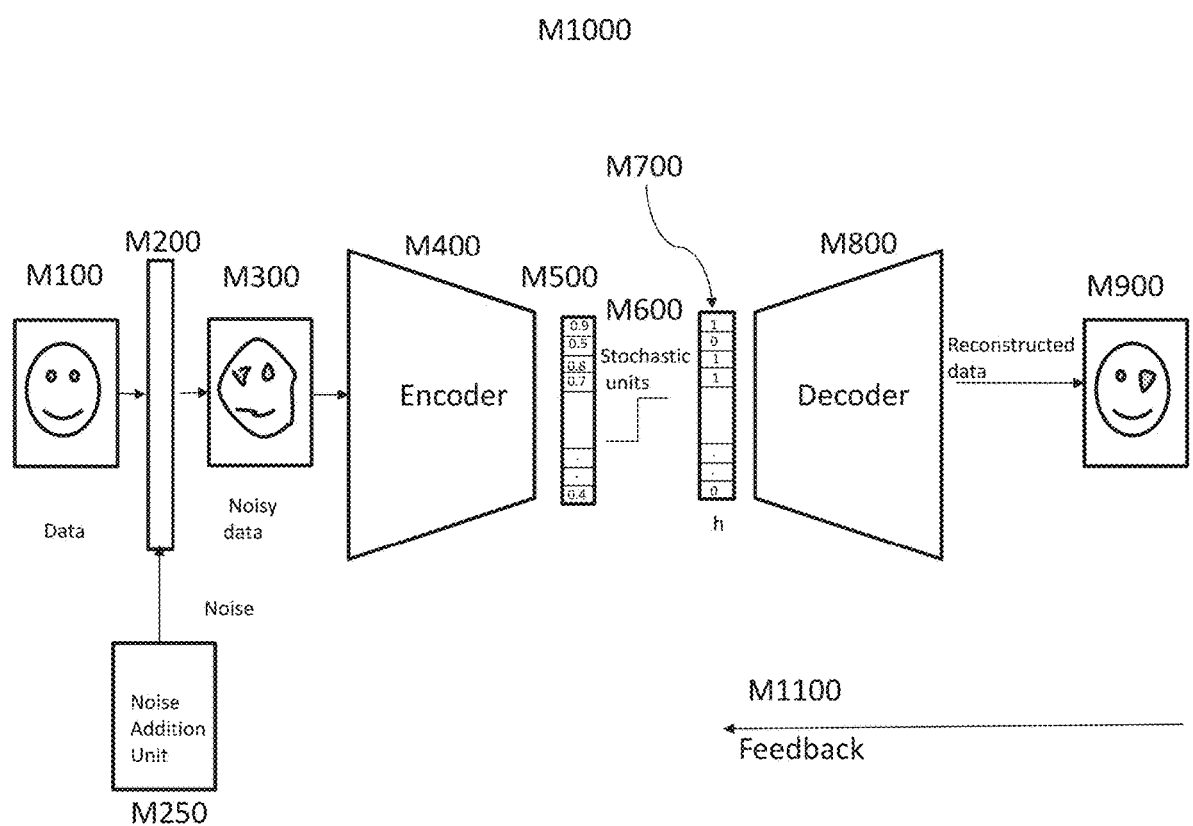
FIG. 2 illustrates a diagrammatic view of a system architecture for a neural network environment for implementing embodiments of the present disclosure, according to embodiments.

FIG. 2 illustrates a diagrammatic view of a system architecture M1000 for a neural network environment for implementing aspects of the present disclosure, according to embodiments. As illustrated in FIG. 2, the system architecture M1000 includes a set of input data M100, noise M200, a noise addition unit M250, a set of noisy data (e.g., the set of input data M100 after noise has been added) M300, an encoder model M400, a pre-stochastic layer M500, a set of stochastic non-linear activation units M600, a set of latent code M700, a decoder model M800, a set of reconstructed data M900, and a feedback technique M1100. In embodiments, the system architecture M1000 may further include a translation model and a classification model (to be described later). The neural network environment is trained with a combination of a weighted code-length loss on the embedding (e.g., the set of latent code) and a reconstruction loss on the output (e.g., the set of reconstructed data). The weighted code-length loss uses the weights to generate a hierarchical order of importance. No constraints are imposed on the architecture.

In embodiments, as illustrated in FIG. 2, noise may be added to the set of input data M100 by the noise addition unit M250. Generally, adding may include applying, inserting, augmenting, or otherwise administering the noise to the set of input data. The noise may include distortion, corruption, or other meaningless data that obscures the features of the set of input data M100. The type of noise added to the set of input data M100 may be selected based on the nature of the set of input data M100. For example, in the case of image data, adding the noise may include inverting pixel colors, where in the case of audio data, adding the noise may include modifying the waveform of an audio signal. The noise distribution may be chosen to be either discrete or continuous, with no constraint on the nature of the distribution except the amount of noise added. The amount of noise added may be determined by privacy constraints and/or the desired quality of the set of reconstructed data. Herein, the addition of noise to the set of unlabeled data A100 may facilitate identification of the manifold of the data. Other methods of adding the noise to the set of input data M100 are also possible.

In embodiments, a set of latent code M700 may be computed based on the set of input data M100 by the encoder model M400 and a set of stochastic non-linear activation units M600. In embodiments, the encoder model M400 may include linear neural network layers, convolutional layers, recurrent layers, or auto regressive layers. Generally, computing may include calculating, generating, producing, imposing, applying, or otherwise deriving the set of latent code M700. Herein, the set of latent code refers to an alphanumeric arrangement or representation of the features of a set of data. In embodiments, the set of latent code may be dimensionally reduced with respect to the set of input data. In addition, in certain embodiments the set of latent code may be a dimensionally reduced binary representation of the set of input data. As an example, as illustrated in FIG. 2, the set of latent code for an image may be "1011," where each digit indicates a different aspect of the image (e.g., shape, color, size). In embodiments, computing the set of latent code M700 may include using the set of stochastic non-linear activation units to impose a weighted loss on output obtained from the encoder model M400 in order to acquire a representation of the data such that the embedding (e.g., latent code) represents the hierarchical relationships in the data. Put differently, this corresponds to learning the minimum energy representation of the data with ordered constraints. Herein, the codes are categorical variables and stochastic non-linear activation units are used in the encoder module.

The input to the encoder model M400 is given by the following Equation 1.

$$X_c = X \circ \eta \qquad (1)$$

In Equation 1, $X_c$ is the input to the encoder model M400, the input to the data is X, $\eta$ is the noise, and $\circ$ is the operation of adding noise to the input.

The loss imposed on the code when training is given by the following Equation 2.

$$L_{code} = <c,h> \qquad (2)$$

In Equation 2, the output of the encoder model M400 is h, where $L_{code}$ represents the loss imposed on the code when training, $<c,h>$ represents the inner product of c and h, and c is the vector of weights of the same dimension as the code. This loss function is obtained by the inner product of the latent code M700 with penalty coefficients, such that the penalty coefficients form a hierarchical structure.

An example of the penalty coefficients used is given by the following Equation 3.

$$c_i = d^i \qquad (3)$$

In Equation 3, i is the ordinal position in the code, and d is a number which depends on the categorical distribution. For example, d=2 may be chosen for binary codes. In this way, the data can be reconstructed with a loss function that penalizes deviation from original data without noise.

In embodiments, a set of reconstructed data M900 is obtained by decoding the set of latent code M700 with a decoder model M800. Generally, obtaining can include producing, acquiring, creating, reconstructing, or otherwise generating the set of reconstructed data by decoding the set of latent code M700 with the decoder model M800. As examples, the decoder model M800 can include feed-forward, convolutional, skip connections, recurrent or auto-regressive layers with non-linear activation units, or the like. As examples, the decoder model M800 may be hosted on a client device (e.g., smart phone, laptop computer). In this way, sets of latent code may be reconstructed by the decoder model M800 on the client device. Other methods of obtaining the set of reconstructed data M900 using the decoder model M800 to decode the set of latent code M700 are also possible.

As described above, a loss function that penalizes deviation from original data without noise may be utilized to impose a loss on the data in order to acquire a representation of the data such that the embedding (e.g., latent code) represents the hierarchical relationships in the data. The total loss is given by the following Equation 4.

$$L_{total} = \lambda L_{code}(c,h) + L_{reconstruction}(X, X_{reconstructed}) \qquad (4)$$

As illustrated by Equation 4, the total loss is composed of the loss due to the generation of the latent code as represented by $\lambda L_{code}(c,h)$ and the reconstruction loss $L_{reconstruction}(X, X_{reconstructed})$ due to reconstruction of the data. Here, X represents the set of input data M11 and $X_r$ represents the set of reconstructed data M900. As illustrated by Equation 4, $L_{total}$ represents the sum of the code loss and the reconstruction loss.

In embodiments, a feedback technique M1100 may be used to train the model to further reduce the total loss. As examples, the feedback technique M1100 may include a back-propagation technique, evolutionary algorithms, or the like. The embedding obtained after training corresponds to the latent factors in the data. As another example, in certain embodiments, aspects of the disclosure relate to adding an auxiliary loss term to the total loss expressed in Equation 4. Accordingly, this is illustrated by the following Equation 5.

$$L_{total} = \lambda L_{code}(c,h) + L_{reconstruction}(X, X_{reconstructed}) + L_{aux} \qquad (5)$$

Here, the $L_{aux}$ term may include sub-gradient loss and regularization loss on the model weights for aiding the primary optimization objective. In this way, generation of latent code by imposing a loss function on input data can facilitate machine learning training efficiency.

Figure 3:
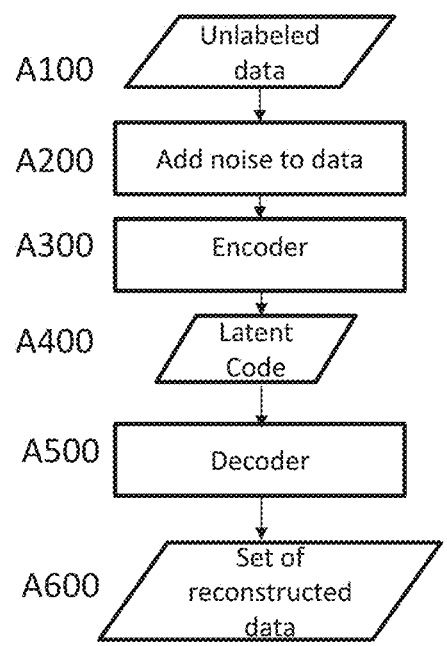
FIG. 3 illustrates a flowchart of a process for discovering latent factors from data in a neural network environment, according to embodiments.

FIG. 3 illustrates a flowchart of a process A1000 for discovering latent factors from data in a neural network environment, according to embodiments. The process A1000 of FIG. 3 may be performed with respect to unlabeled data in order to derive latent factors. In embodiments, the process A1000 may include a training phase and an inference phase. In the training phase, the neural network (e.g., the neural network depicted in FIG. 2) may be trained to generate sets of reconstructed data from sets of latent code generated by an encoder model. In the inference phase, hierarchical relationships may be extracted from the data.

A set of unlabeled data (e.g., a set of input data) A100 is input to the model (e.g., the neural network depicted in FIG. 2). The set of input data A100 represents the set of data for which the latent code is to be generated. Next, as described above, at block A200, noise is added to the set of unlabeled data. The noise distribution and operation of composing noise with data can be chosen without any constraints. The amount of noise added may depend on the degree to which the actual samples (e.g., exemplars) deviate from the target manifold/distribution. For instance, in the case that the set of actual samples depict images of numerals, if the numerals in the dataset are depicted consistently with few variations, a low amount of noise may be sufficient. In contrast, if there is a high degree of variance in the depiction of the numerals (e.g., some numerals are written in a stylized font while some are written in a block typeface) it may be desirable to add a greater amount of noise in order to discover the underlying manifold of the dataset. In addition, it should be noted that the reconstruction quality of the dataset may depend on how many bits are permitted for use in the latent code (e.g., a greater number of bits may allow for a greater reconstruction quality).

At block A300, the encoder model is used to encode the noisy data. The encoder model is a neural network model, and may include linear neural network layers, convolutional layers, skip connections, recurrent layers, or auto-regressive layers, but is not limited thereto, and other types of encoder models are also possible. In embodiments, the model may include stochastic non-linear activation units and nonlinear activation units are configured to produce a set of latent code A400 as a categorical variable.

The latent code generated by the encoder model and the set of stochastic linear units may be used to reconstruct the set of input data. As described above, in the training phase, a code loss $L_{code}$ is imposed on the network. This loss function is obtained by taking the inner product of the latent code h with penalty coefficients c, such that the penalty coefficients form a hierarchical structure. The code loss is given by the following Equation 6.

$$L_{code} = <c,h> \quad (6)$$

An example of the penalty coefficients used in this computation is given by the following Equation 7.

$$c_i = d^i \quad (7)$$

Here, i is the ordinal position in the code, and d is a number which depends on the categorical distribution. For example d=2 may be chosen for binary codes.

At block A500, the decoder model may generate a set of reconstructed data A600 from the set of latent code A400. For example, in the case that the set of input data was an image, the decoder model may reconstruct a version of the input image without noise. In embodiments, as described herein, the decoder model may include feed-forward, convolutional, skip connections, and/or recurrent or auto-regressive layers with non-linear activation units, but is not limited thereto, and other types of decoder models are also possible. In certain embodiments, an ensemble of decoder models can be used to generate the set of reconstructed data A600.

In embodiments, a reconstruction loss may be calculated from the set of reconstructed data A600. This reconstruction loss indicates the similarity of the set of input data to the set of reconstructed data. As described herein, this reconstruction loss constitutes one term of the total loss. The total loss is given by the sum of the reconstruction loss and the code loss (e.g., loss due to generating the latent code from the noisy data). This total loss $L_{total}$ expressed by the following Equation 8.

$$L_{total} = \lambda L_{code}(c,h) + L_{reconstruction}(X, X_{reconstructed}) \quad (8)$$

Here, $\lambda L_{code}(c,h)$ represents the code loss, and $L_{reconstruction}(X, X_{reconstructed})$ represents the reconstruction loss, where X represents the set of input data and $X_r$ represents the set of reconstructed data.

In embodiments, a feedback technique may be used to train the model to further reduce the total loss. As examples, the feedback technique may include a back-propagation technique, evolutionary algorithms, or the like. The embedding obtained after training corresponds to the latent factors in the data. As another example, in certain embodiments, aspects of the disclosure relate to adding an auxiliary loss term to the total loss expressed in Equation 8. Accordingly, this is illustrated by the following Equation 9.

$$L_{total} = \lambda L_{code}(c,h) + L_{reconstruction}(X, X_{reconstructed}) + L_{aux} \quad (9)$$

Here, the $L_{aux}$ term may include sub-gradient loss and regularization loss on the model weights for aiding the primary optimization objective.

Next, the inference phase will be described. In the inference phase, in certain embodiments, noise addition at block A200 may be bypassed. Accordingly, the input to the encoder A300 may be either the set of unlabeled data A100 or the set of noisy data (e.g., the set of unlabeled data A100 to which noise has been added). The latent code A400 generated by the encoder A300 may be used to extract hierarchical relationships from the data. Next, the decoder model A500 may be configured to generate the set of reconstructed data A600. In the case that latent code extraction is the primary objective, the step of generating the set of reconstructed data A600 may be bypassed. Alternatively, aspects of the disclosure relate to modifying the set of latent code A600 according to desired attributes (e.g., adjusting the parameters of the set of latent code A600 to modify features of the data). For example, in the case that the set of unlabeled data A100 is an image of a human face, the set of latent code A600 may be modified to add a desired attribute such as a mustache to the human face. Other methods of performing the inference phase and modifying the set of latent code are also possible.

Figure 4:
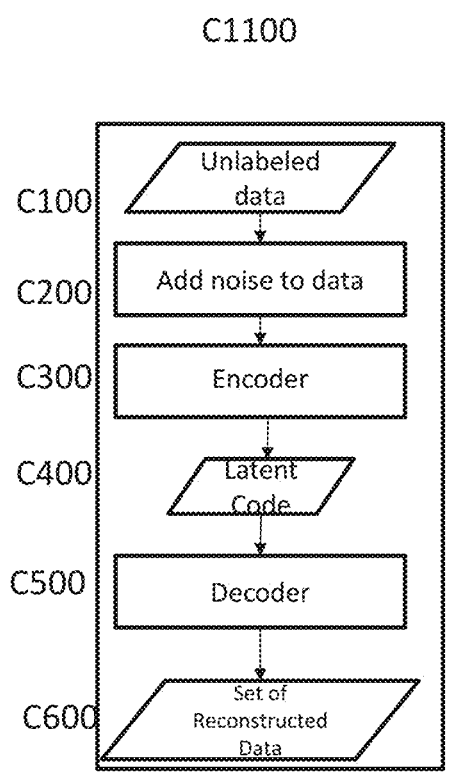
FIG. 4 illustrates a first flowchart of a process for generating data with desired attributes, according to embodiments.

FIG. 4 illustrates a first flowchart of a process C1100 for generating data with desired attributes, according to embodiments. As described herein, aspects of the disclosure relate to modifying the set of latent code in order to generate data with desired attributes. Generally, these desired attributes may include properties, features, or characteristics that define an aspect of the data. As examples, the desired attributes may be colors, shapes, or objects in an image, letters or words in a text, audio signals in an audio file, or the like. In embodiments, the process C1100 may include a training phase and an inference phase. In the training phase, the neural network (e.g., the auto-encoder of the neural network depicted in FIG. 2) may be trained to generate sets of reconstructed data from sets of latent code generated by an encoder model, a classification model may be trained using sets of labeled data, and a translation model may be trained. In the inference phase, hierarchical relationships may be extracted from the data, and the set of reconstructed data may be generated with desired attributes. As illustrated in FIG. 4, the process C1100 may include a set of unlabeled data (set of input data) C100, a block C200 for adding noise to the set of unlabeled data, an encoder C300, a set of latent code C400, a decoder C500, and a set of reconstructed data C600. In the following description, the explanation for those elements that are substantially similar to previously described elements will be omitted.

In embodiments, the decoder C500 of FIG. 4 may be trained with a feedback technique (e.g., back propagation, evolutionary algorithms) using the loss mentioned in Equation 9. The decoder C500 may be a part of an auto-encoder model, generative adversarial network, activation maximizing generative model or autoregressive network. In embodiments, the decoder model C500 may be frozen (not trained further).

Figure 5:
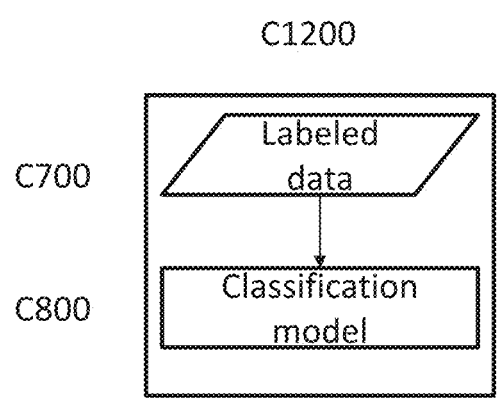
FIG. 5 illustrates a second flowchart of a process for generating data with desired attributes, according to embodiments.

FIG. 5 illustrates a second flowchart of a process C1200 for generating data with desired attributes, according to embodiments. Aspects of FIG. 5 relate to training a classifier model to discriminate between desired attributes. As illustrated in FIG. 5, the process C1200 includes a set of labeled data C700 and a first classification model C800. Generally, the classification model may include a model configured to draw conclusions from observed values. For example, given one or more inputs, a classification model can predict the value of one or more outcomes. These outcomes are labels that can be applied to a dataset. As an example, a classification model may be configured to analyze financial transactions, and classify each transaction as "fraudulent" or "authorized." Here, the first classification model C800 may be trained using a set of labels C700. For example, the set of labels C700 may be labels classifying emails as "spam" or "not spam."

Figure 6:
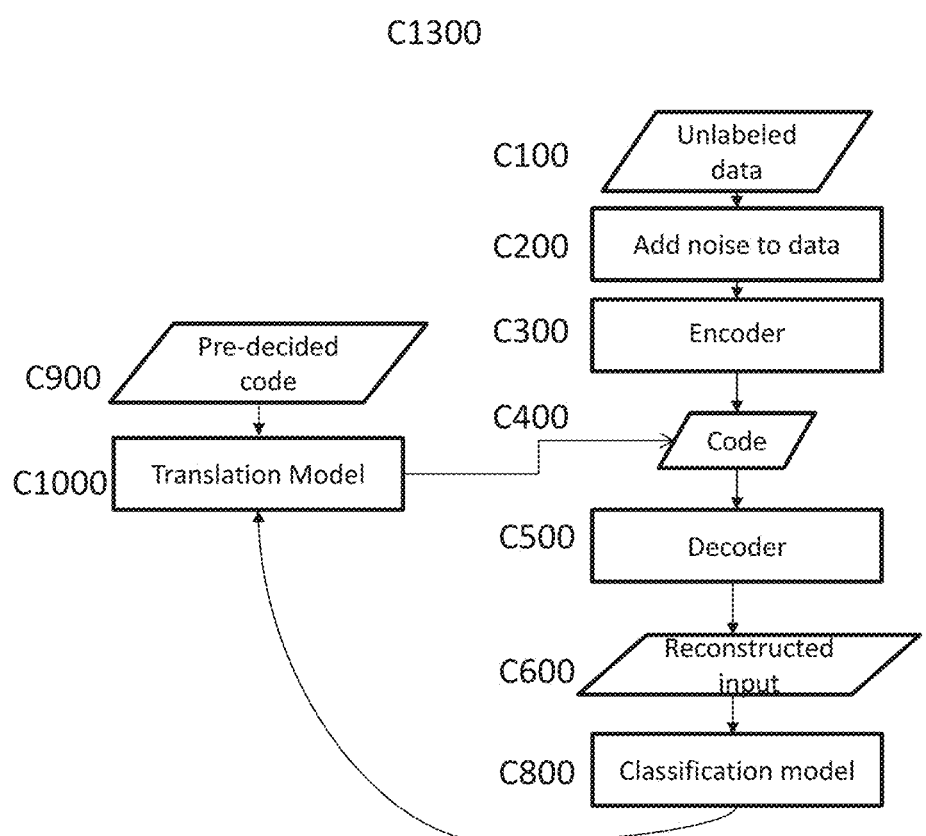
FIG. 6 illustrates a third flowchart of a process for generating data with desired attributes, according to embodiments.

FIG. 6 illustrates a third flowchart of a process C1300 for generating data with desired attributes, according to embodiments. Aspects of FIG. 6 relate to generating a set of reconstructed data having a set of desired attributes. In embodiments, the set of unlabeled data C100, the block C200 for adding noise to the set of unlabeled data C100, the encoder C300, the latent code C400, the decoder C500, the set of reconstructed data C600, and the classification model C800 may be substantially similar to the elements denoted with the same reference numerals in FIG. 4 and FIG. 5.

In embodiments, a code translation model C1000 may be used to translate a set of pre-determined code C900 to the data generating code for producing desired attributes. The set of pre-determined code may include a set of non-latent code that represents a data set. The translation model C1000 can be any neural network, and may include feed-forward, convolutional, recurrent or auto-regressive layers with non-linear activation units, but is not limited thereto, and other types of translation models are also possible. As illustrated in FIG. 6, the code translation network C1000 is given a set of pre-determined code C900 as input. The set of reconstructed data C600 output by the decoder C500 may be provided to the classification network C800 (e.g., the classification network C800 trained using the set of labels C700 of FIG. 5) and trained to distinguish between desired feature attributes. The translation model C1000 may be trained using the loss obtained from the classification model C800 trained using the set of labels C700. When trained, the translation model C1000 may be used to generate sets of latent code C400 (e.g., a set of attribute code) that is configured to produce desired attributes in the set of reconstructed data C600 when provided to the decoder model C500. In this way, the speed and efficiency of machine learning training may be increased.

Next, an inference phase will be described with respect to FIG. 6. In embodiments, the set of pre-determined code C900 is input to the translation model C1000. Accordingly, a set of translated code is output from the translation model C1000 as the set of latent code C400. This set of latent code is used as the input to the decoder C500. Next, as described herein, the decoder C500 may use the set of latent code C400 translated by the translation model C1000 to generate a set of reconstructed data C600 with desired attributes.

Figure 7:
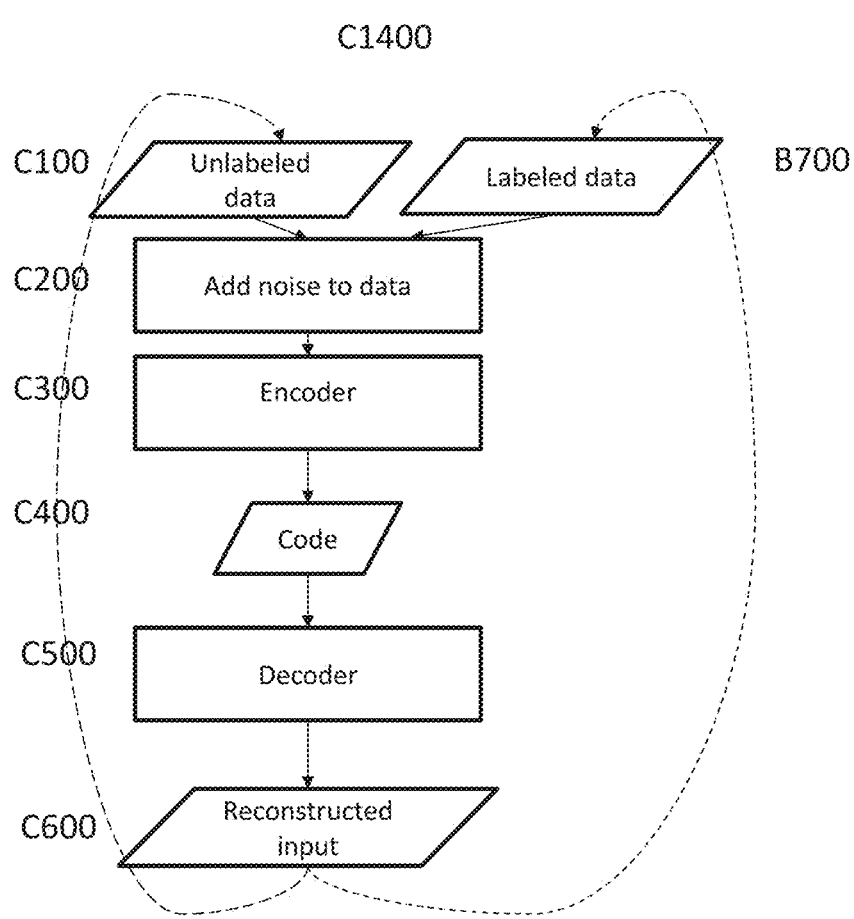
FIG. 7 illustrates a flowchart of a process for discovering latent factors from data in a neural network environment when both labeled data and unlabeled data are available, according to embodiments.

FIG. 7 illustrates a flowchart of a process C1400 for discovering latent factors from data in a neural network environment when both labeled data and unlabeled data are available, according to embodiments. In embodiments, the set of unlabeled data C100, the block C200 for adding noise to the set of unlabeled data C100, the encoder C300, the latent code C400, the decoder C500, and the set of reconstructed data C600, may be substantially similar to the elements denoted with the same reference numerals in FIG. 4, FIG. 5, and FIG. 6.

In embodiments, as illustrated in FIG. 7, in cases where both labeled and unlabeled data are available, the encoder model may be configured to receive a set of unlabeled data C100 as well as a set of labeled data B700 as inputs. Herein, the flow of the process C1400 from C200 to C600 is the same as that described with respect to FIG. 4, FIG. 5, and FIG. 6. In certain embodiments, the classification loss Lds can be added for the samples where class labels are known.

Figure 8:
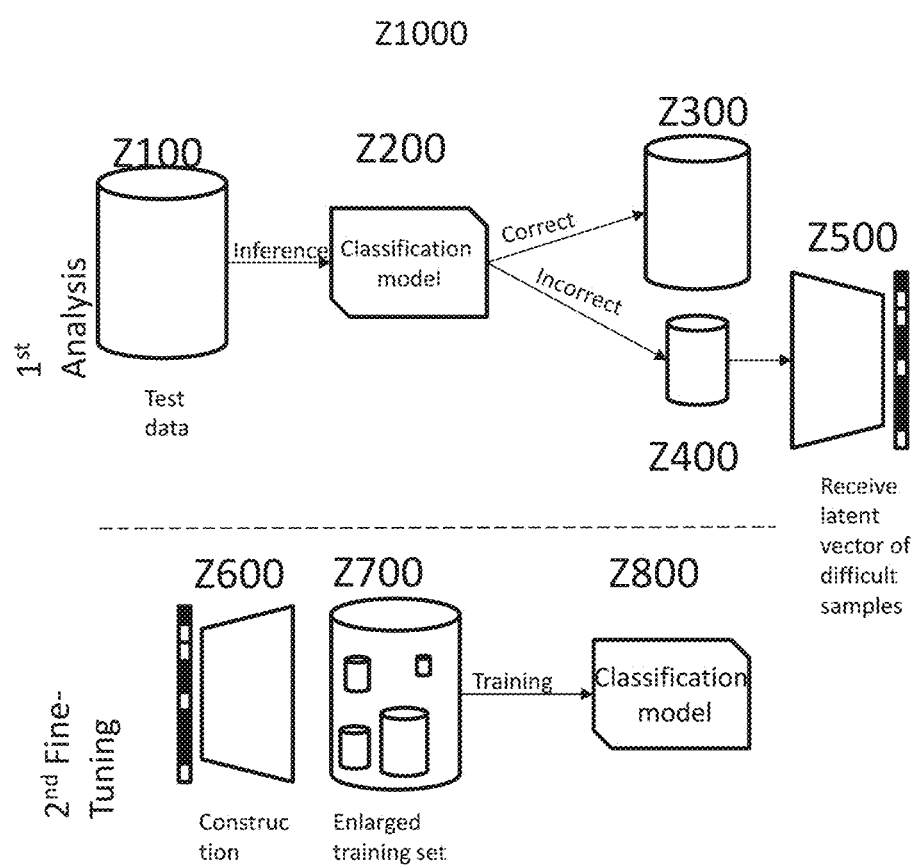
FIG. 8 illustrates a flowchart of a process for generating hard samples for training a classification model, according to embodiments.

FIG. 8 illustrates a flowchart of a process Z1000 for generating hard samples for training a classification model, according to embodiments. In embodiments, aspects of the disclosure relate to the recognition that in certain situations, certain data sets may have features that are difficult to easily classify (e.g, data points may belong to a single cluster or multiple clusters). Accordingly, aspects of the disclosure relate to finding hard samples to facilitate training of classification models.

As illustrated in FIG. 8, a classification model 2200 (e.g., a first classification model) may receive a set of test data Z100. The classification model Z200 may be configured to classify the set of test data (e.g., label fraudulent financial transactions and authorized financial transactions). Accordingly, the classification model 2200 may output a set of correctly classified samples 2300 and a set of misclassified samples 2400 (e.g., hard samples). These misclassified samples may be utilized as inputs to the neural network in order to generate latent code. More particularly, the set of misclassified samples 2400 may be provided to an encoder model (e.g., the encoder model of the neural network depicted in FIG. 2) Z500.

Next, the encoder model Z500 may compute a set of latent code for the set of misclassified data samples 2400. Variations may be generated in the latent code for the set of misclassified data samples 2400 (e.g., to generate desired attributes). Subsequently, a decoder model (e.g., the decoder model of the neural network depicted in FIG. 2) Z600 may generate a set of data samples based on the set of latent code for the set of misclassified data samples 2400. Finally, a machine learning technique may be performed to train a classification model 2800 (e.g., a second classification model) using the set of data samples generated based on the set of latent code for the set of misclassified data samples Z400. In embodiments, the classification model 2800 may be the same classification model as the classification model Z200. In certain embodiments, the classification model Z800 may be different than the classification model 2200. In this way, training a classification model using the misclassified samples (e.g., hard/challenging samples) of another classification model may be associated with machine learning efficiency.

Figure 9:
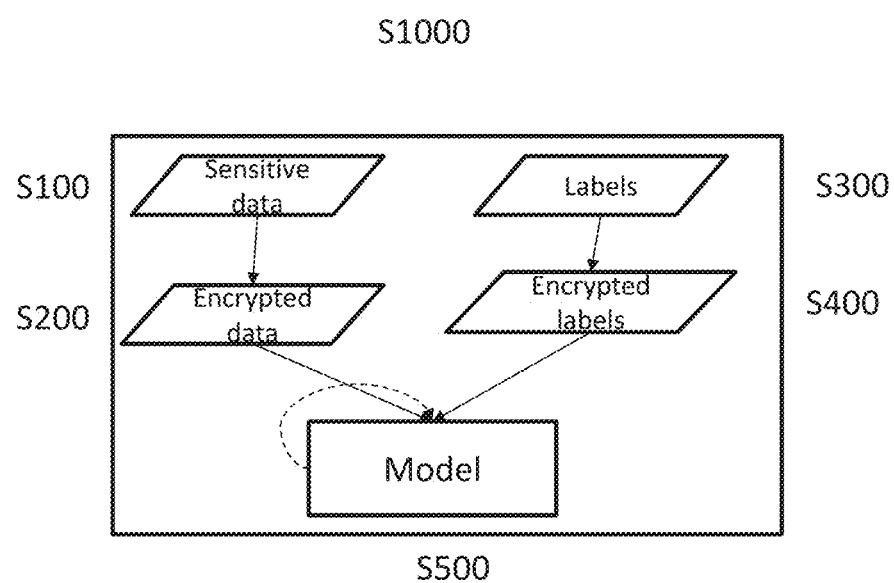
FIG. 9 illustrates a first flowchart of a training technique in cases where sensitive data is available, according to embodiments.

FIG. 9 illustrates a first flowchart of a training technique S1000 in cases where sensitive data is available, according to embodiments. Aspects of the disclosure relate to the recognition that, in certain embodiments, particular types of data (e.g., financial transaction data, medical data) may contain sensitive content. Further, regulatory compliance, security, and privacy restrictions associated with data may necessitate the encryption of the data prior to performing neural network computations. By way of example, medical records, financial data, personally Identifiable Information (PII) data, and government documents can be associated with restrictions that limit the capacity for machine learning operations to be performed on the user data. Unencrypted data is different from encrypted data in that encrypted data is encoded such that only authorized parties can read the data. When data are encrypted, the content of the data is denied to an interceptor. In this regard, conventional neural networks models do not support neural network computations on encrypted data because the neural network models are not configured to perform computations on encrypted data.

While existing techniques allow for neural network training on encrypted data, these approaches require that the input data first be encrypted, necessitating that a user first encrypt his or her data before performing training, as well as decrypt the output of this training process to interpret the result. Accordingly, aspects of FIG. 9 and FIG. 10 relate to a process for training a model using encrypted data, and performing subsequent fine-tuning of the model using public, unencrypted data. As the input and output data sets are not encrypted, such a technique is associated with reduced cost (e.g., in terms of time, financial cost, and computing resources) in comparison with existing approaches.

As illustrated in FIG. 9, a set of sensitive data S100 and a set of labels S300 are encrypted using homomorphic encryption, and a set of encrypted data S200 and a set of encrypted labels S400, respectively, are obtained. Herein, homomorphic encryption can refer to an encryption scheme which allows computations over encrypted data. With homomorphic encryption, certain computations can be performed even when the data is in encrypted form with guarantees to generate correct results. Homomorphic encryption generally supports addition, subtraction, and multiplication over encrypted data. Division and comparisons may not be supported, and multiplication may quadratically introduce noise to ciphertexts. The set of encrypted data S200 and the set of encrypted labels S400 are provided to a model S500 (e.g., a classification mode), and the model S500 is trained using polynomial operations.

Figure 10:
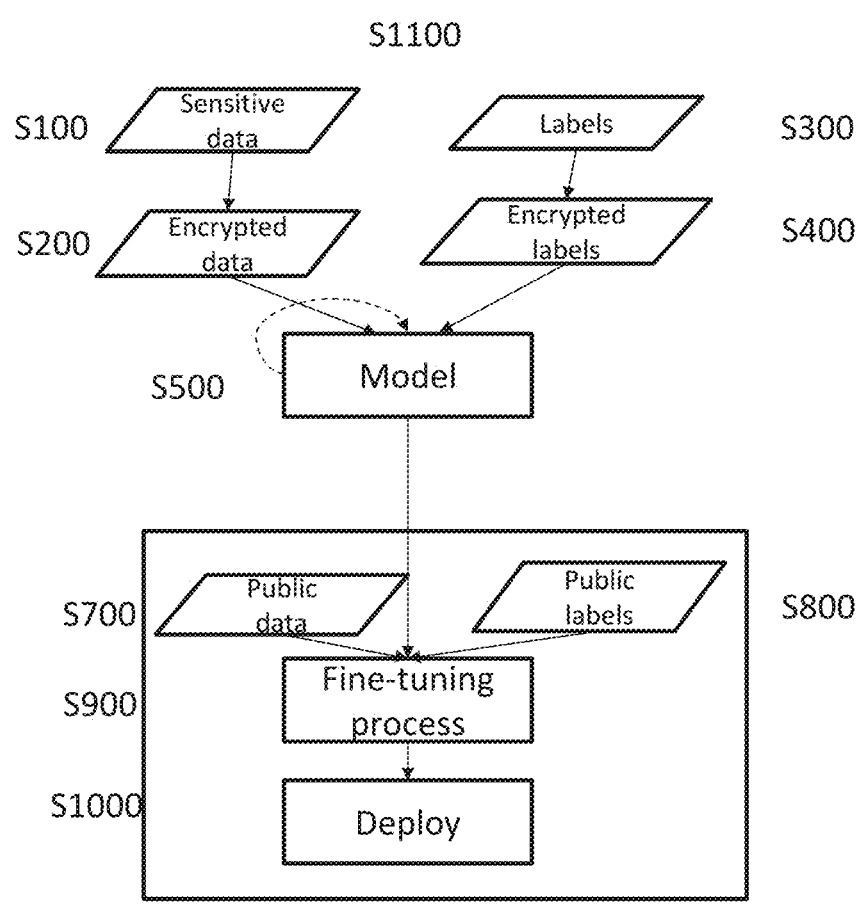
FIG. 10 illustrates a second flowchart of a training technique in cases where sensitive data is available, according to embodiments.

FIG. 10 illustrates a second flowchart of a training technique S1100 in cases where sensitive data is available, according to embodiments. In embodiments, the trained model S500 (e.g., the classification model trained using the set of encrypted data S200 and the set of encrypted labels S400) is used for initialization of fine-tuning operations on public data S700 and S800 which is not encrypted. More particularly, in embodiments, an encoder model of the model S500 may compute a set of latent code (e.g., a second set of latent code) corresponding to a set of unencrypted data. Next, a fine-tuning technique may be performed with respect to the model S500 using the set of unencrypted data and the set of latent code corresponding to the set of unencrypted data. Subsequently, the fine-tuned model S900 is deployed as represented by S1000 to generate predictions with respect to data that is not encrypted.

Figure 11:
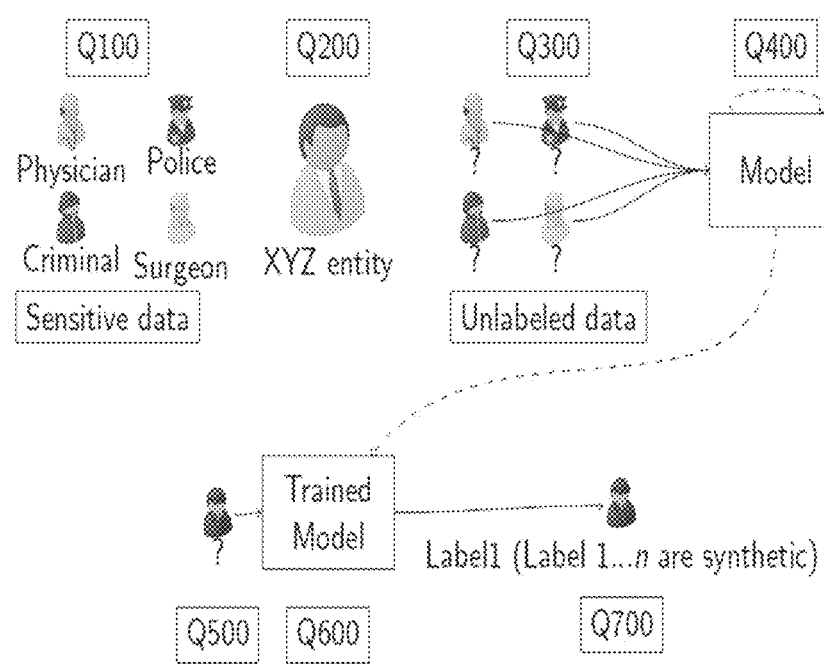
FIG. 11 illustrates an example of a first use case of an aspect of the present disclosure, according to embodiments.

FIG. 11 illustrates an example of a first use case of an aspect of the present disclosure, according to embodiments. In embodiments, sensitive data Q100 from a customer Q200 (e.g., labeled data) may be processed to remove labels Q300. Alternatively, the customer Q200 may provide unlabeled data Q300. Using the techniques described herein, a set of fake labels Q700 may be created from the latent codes obtained after encoding the received data. In embodiments, unlabeled data may be collected to generate data with fake labels as a service. Herein, it should be recognized that a service is only one possible application, and the neural networks/software models configured to perform each function described herein can be provided as software packages, hardware, or the like to allow for application in a local client context.

Figure 12:
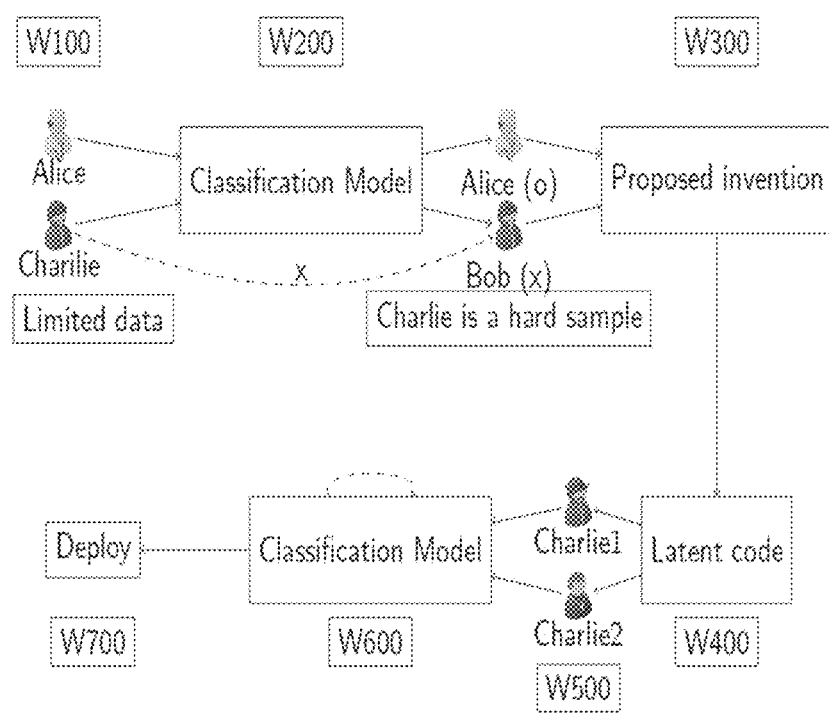
FIG. 12 illustrates an example of a second use case of an aspect of the present disclosure, according to embodiments.

FIG. 12 illustrates an example of a second use case of an aspect of the present disclosure, according to embodiments. In embodiments, data may be used to train a classifier model, and hard samples (e.g., misclassified samples, challenging samples) may be identified. These hard samples may be used as inputs to the model, and the obtained latent code may be modified to obtain more hard samples. The classification model thus obtained can be used to provide classification as a service. Generation of additional hard samples from the identified hard samples may be provided as a service. Herein, it should be recognized that a service is only one possible application, and the neural networks/software models configured to perform each function described herein can be provided as software packages, hardware, or the like to allow for application in a local client context.

Figure 13:
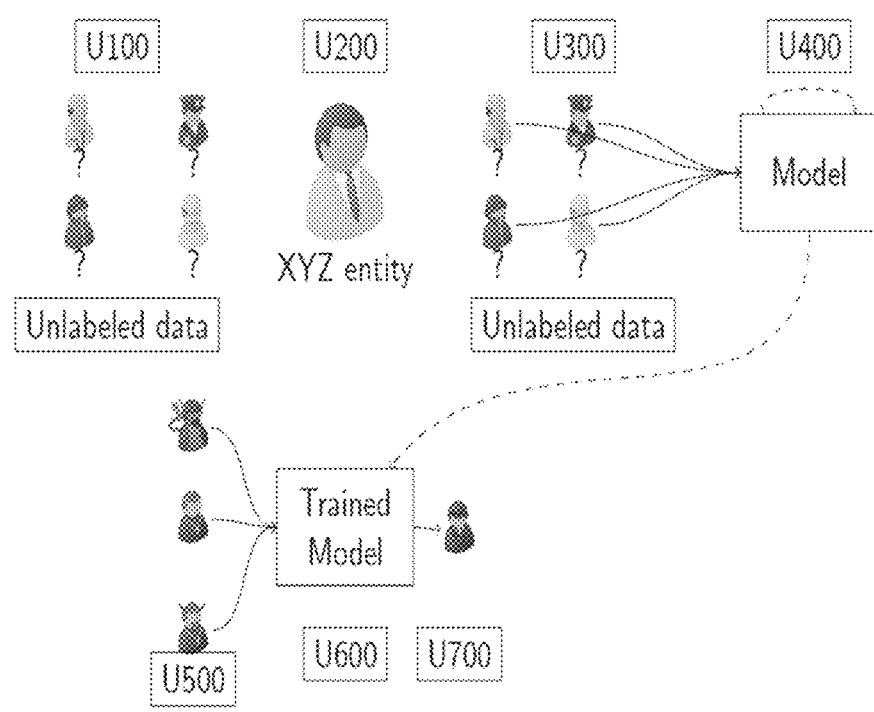
FIG. 13 illustrates an example of a third use case of an aspect of the present disclosure, according to embodiments.

FIG. 13 illustrates an example of a third use case of an aspect of the present disclosure, according to embodiments. Unlabeled data U300 may be obtained from an entity U200. In embodiments, this unlabeled data U300 may be used to train a model U400, as described herein. The trained model U600 may be used to identify common features U700 from other sets of data U500 as a service. Herein, it should be recognized that a service is only one possible application, and the neural networks/software models configured to perform each function described herein can be provided as software packages, hardware, or the like to allow for application in a local client context.

Figure 14:
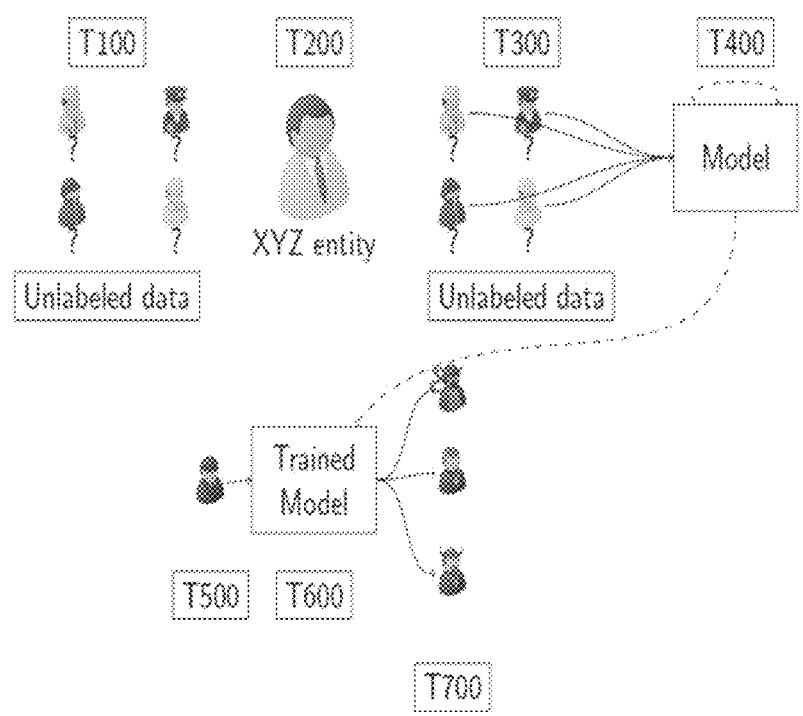
FIG. 14 illustrates an example of a fourth use case of an aspect of the present disclosure, according to embodiments.

FIG. 14 illustrates an example of a fourth use case of an aspect of the present disclosure, according to embodiments. In embodiments, a set of data T300 obtained from an entity T200 may be used to train a model T400 as described herein. The trained model T600 may be used to generate a set of desired attributes T700 in sets of input data T500 as a service. Herein, it should be recognized that a service is only one possible application, and the neural networks/software models configured to perform each function described herein can be provided as software packages, hardware, or the like to allow for application in a local client context.

Figure 15:
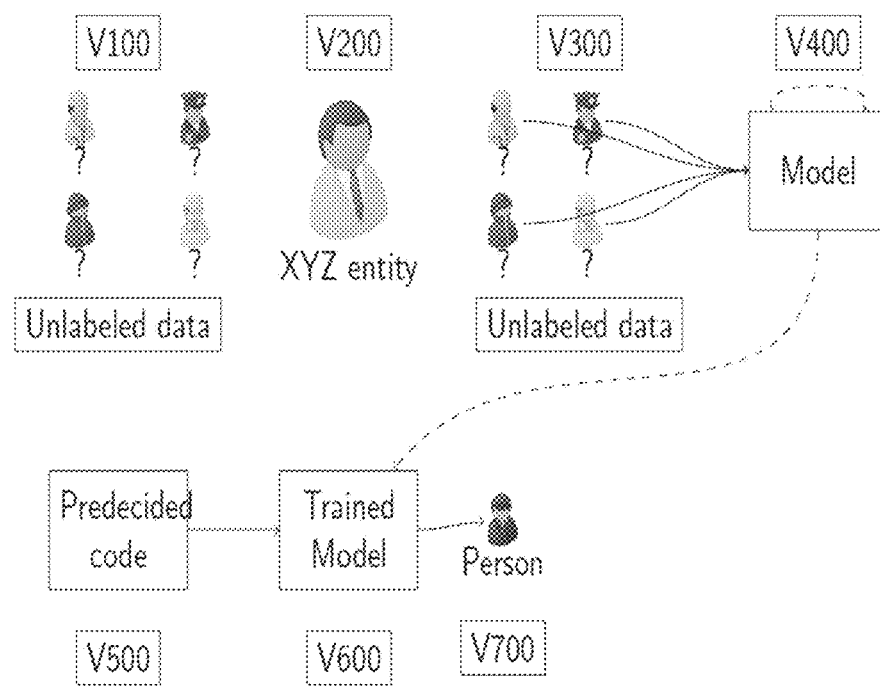
FIG. 15 illustrates an example of a fifth use case of an aspect of the present disclosure, according to embodiments.

FIG. 15 illustrates an example of a fifth use case of an aspect of the present disclosure, according to embodiments. A set of data V100 obtained from an entity V200 may be used to train a model V400 as described herein. The trained model V600 may be used to generate desired attributes with pre-determined code as a service. Herein, it should be recognized that a service is only one possible application, and the neural networks/software models configured to perform each function described herein can be provided as software packages, hardware, or the like to allow for application in a local client context.

Figure 16:
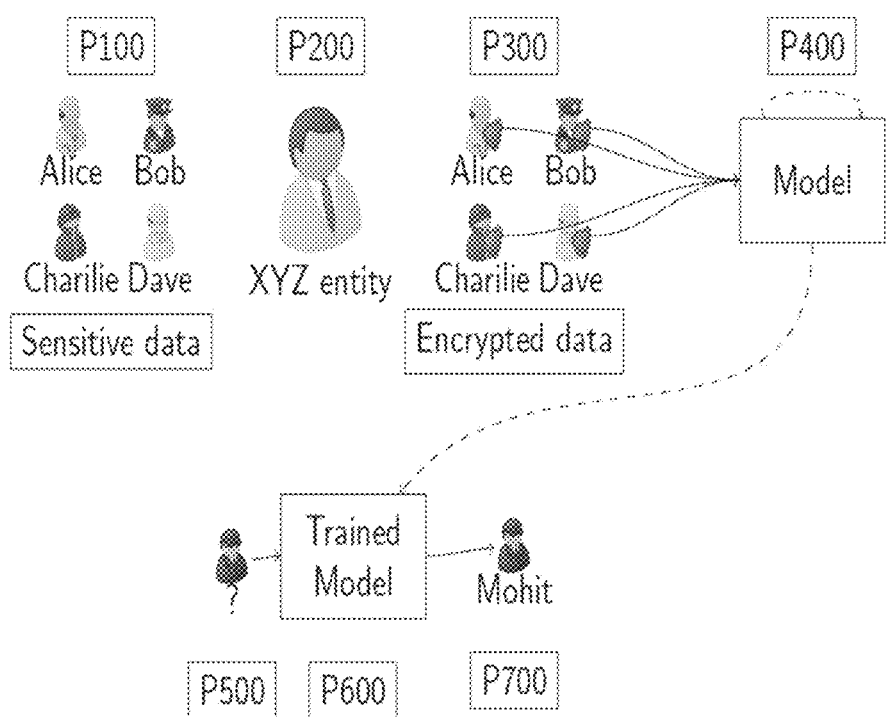
FIG. 16 illustrates an example of a sixth use case of an aspect of the present disclosure, according to embodiments.

FIG. 16 illustrates an example of a sixth use case of an aspect of the present disclosure, according to embodiments. Sensitive data P100 may be encrypted by an entity P200 to obtain encrypted data P300. The encrypted data P400 may be used to train a model. In this way, a model that is fine-tuned on public data, takes un-encrypted data as its input, and provides unencrypted data as its output may be used to generate predictions about client data as a service. Herein, it should be recognized that a service is only one possible application, and the neural networks/software models configured to perform each function described herein can be provided as software packages, hardware, or the like to allow for application in a local client context.

In addition to the above described use cases, aspects of the present disclosure may be utilized to de-noise noisy data. More particularly, in embodiments, the neural network may receive a set of noisy data. This data may include images, audio files, text, or other data that has been corrupted or otherwise distorted. As an example, the set of noisy data may include images of blurry vehicle license plates. Next, the encoder model and the set of stochastic non-linear units may be configured to compute a second set of latent code based on the set of noisy data. Subsequently, a decoder model may be utilized to decode the second set of latent code to obtain a set of de-noised data. In this way, data that was originally uninterpretable may be converted to readily interpretable data. As an example, blurry vehicle license plates may be de-noised to obtain readily-readable license plate images.

In certain embodiments, aspects of the disclosure relate to compress sets of input data. More particularly, in this case, a remotely located server equipped with the encoder model of the present disclosure may be used to perform data compression on a set of input data and generate a set of latent code. The set of latent code resulting from this compression may be transmitted over a communication medium (e.g., a network) from the server to a client device. The client device may be equipped with the decoder model of the present disclosure in its memory. Accordingly, the client device may utilize the decoder model to process the set of latent code (e.g., compressed data) received from the server to reproduce the original set of input data (e.g., in a non-compressed form). Other methods of data compression using the encoder model and decoder model are also possible.

In certain embodiments, aspects of the disclosure relate to receiving a first set of latent code for a first set of data, and receiving a second set of latent code for a second set of data. Next, the neural network may compare the first set of latent code with the second set of latent code, to determine whether the first set of data achieves a similarity threshold with respect to the second set of data. In response to determining that the first set of data achieves the similarity threshold (e.g., 80% identical, 90% identical, 100% identical) with respect to the second set of data, the neural network may merge the first set of data and the second set of data to generate a combined data set. In this way, similar data sets may be identified and combined to facilitate data management, reduce data file sizes, and the like.

In embodiments, aspect of the disclosure relate to the recognition that the decoder model (e.g., decoder M800) may be configured to prioritize particular aspects of datasets with respect to reconstruction. More particularly, the decoder model may focus only on certain aspects for reconstruction, and ignore other aspects. As an example, the decoder model may be configured to only reconstruct the shape of certain objects in an image while ignoring color information. In this case, the latent code produced by the encoder model (e.g., set of latent code M700) may be optimized to accurately represent the shape of the input dataset while not including color information in the latent code. Accordingly, aspects of this embodiment may be associated with benefits such as the creation of shorter, more efficient latent code. Other methods of prioritizing aspects for reconstruction are also possible.

In embodiments, aspects of the disclosure relate to receiving a second set of input data. In certain embodiments, the second set of input data may be different than the first set of input data. In certain embodiments, the second set of input data may be the same as the first set of input data. Next, encoder model and the set of stochastic non-linear units may compute a second set of latent code for the second set of input data. Subsequently, a set of labels corresponding to the second set of latent code may be assigned to the second set of input data. In this way, latent feature classification in neural networks may be facilitated.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

REFERENCE SIGNS LIST

M100 Set of Input Data
M200 Noise
M300 Set of Noisy Data
M400 Encoder Model
M500 Pre-Stochastic Layer
M600 Set of Stochastic Non-Linear Activation Units
M700 Set of Latent Code
M800 Decoder Model
M900 Set of Reconstructed Data
M1100 Feedback Technique

What is claimed is:

1. A method for discovering latent factors from data in a neural network environment, the method comprising:
adding, by a data noise unit of the neural network environment, noise to a set of input data;
computing, by the encoder model and a set of stochastic non-linear units, a set of latent code based on the set of input data; and
obtaining, by decoding the latent code with a decoder model, a set of reconstructed data;
applying, with respect to the neural network, a loss function to obtain a code loss value;
calculating, from the set of reconstructed data, a reconstruction loss value that indicates a similarity of the set of reconstructed data with respect to the set of input data;
computing, using the reconstruction loss value and the code loss value, a total loss value; and performing, with respect to the neural network, a feedback technique to reduce the total loss value.

2. The method of claim 1, further comprising:
utilizing both the set of input data and the set of latent code computed by the encoder network for the set of input data to train a classification model.

3. The method of claim 1, further comprising:
providing, to a code translation model, a set of predetermined code;
providing the set of reconstructed data to a classification model configured to classify a plurality of desired feature attributes;
training the code translation model using the total loss value obtained from the classification model; and
generating, using the code translation network, a set of attribute code that is configured to produce a set of desired attributes when provided to the decoder model.

4. The method of claim 1, further comprising:
receiving, from a first classification model, a set of misclassified data samples;
computing, by the encoder model, a set of latent code for the set of misclassified data samples;
generating, by the decoder model, a set of data samples based on the set of latent code for the set of misclassified data samples; and
performing, using the set of data samples based on the set of latent code for the set of misclassified data samples, a machine learning technique with respect to a second classification model.

5. The method of claim 1, further comprising
performing, with respect to a classification model, a machine learning technique using a set of encrypted data;
computing, by an encoder model, a second set of latent code corresponding to a set of unencrypted data; and
performing, with respect to the classification model in response to both performing the machine learning technique using the set of encrypted data and computing the second set of latent code corresponding to the set of unencrypted data, a fine tuning technique using the set of unencrypted data and the set of latent code corresponding to the set of unencrypted data.

6. The method of claim 1, further comprising:
receiving, by the neural network, a set of noisy data;
computing, by the encoder model and the set of stochastic non-linear units, a second set of latent code based on the set of noisy data; and
obtaining, by decoding the second set of latent code with the decoder model, a set of de-noised data.

7. The method of claim 1, further comprising:
receiving a second set of input data;
computing, by the encoder model and the set of stochastic non-linear units, a second set of latent code for the second set of input data; and
assigning, to the second set of input data, a set of labels corresponding to the second set of latent code for the second set of input data.

8. The method of claim 1, further comprising:
transmitting, to a client device, the set of latent code based on the set of input data; and
reconstructing, by the client device using the decoder model, the set of input data from the set of latent code.

9. A method for discovering latent factors from data in a neural network environment, the method comprising:
adding, by a data noise unit of the neural network environment, noise to a set of input data;
computing, by the encoder model and a set of stochastic non-linear units, a set of latent code based on the set of input data; and
obtaining, by decoding the latent code with a decoder model, a set of reconstructed data;
receiving a first set of latent code for a first set of data;
receiving a second set of latent code for a second set of data;
determining, by comparing the first set of latent code with the second set of latent code, whether the first set of data achieves a similarity threshold with respect to the second set of data; and
merging, in response to determining that the first set of data achieves the similarity threshold with respect to the second set of data, the first set of data and the second set of data to generate a combined data set.

10. A device for discovering latent factors from data in a neural network environment, the device comprising:
a memory having a set of computer readable computer instructions, and
a processor for executing the set of computer readable instructions, the set of computer readable instructions including:
adding, by a data noise unit of the neural network environment, noise to a set of input data;
computing, by the encoder model and a set of stochastic non-linear units, a set of latent code based on the set of input data;
obtaining, by decoding the latent code with a decoder model, a set of reconstructed data;
applying, with respect to the neural network, a loss function to obtain a code loss value;
calculating, from the set of reconstructed data, a reconstruction loss value that indicates a similarity of the set of reconstructed data with respect to the set of input data;
computing, using the reconstruction loss value and the code loss value, a total loss value; and
performing, with respect to the neural network, a feedback technique to reduce the total loss value.

11. The device of claim 10, further comprising:
utilizing both the set of input data and the set of latent code computed by the encoder network for the set of input data to train a classification model.

12. A computer program product for data orchestration platform management in a network communication environment including a set of information sources, the computer program product comprising a computer readable storage medium having program instructions embodied therewith, wherein the computer readable storage medium is not a transitory signal per se, the program instructions executable by a processor to cause the processor to perform a method comprising:
adding, by a data noise unit of the neural network environment, noise to a set of input data;
computing, by the encoder model and a set of stochastic non-linear units, a set of latent code based on the set of input data;
obtaining, by decoding the latent code with a decoder model, a set of reconstructed data;
providing, to a code translation model, a set of predetermined code;
providing the set of reconstructed data to a classification model configured to classify a plurality of desired feature attributes;
training the code translation model using the total loss value obtained from the classification model; and generating, using the code translation network, a set of attribute code that is configured to produce a set of desired attributes when provided to the decoder model.

\* \* \* \* \*